United States Patent [19]

Lewarchik et al.

[11] Patent Number: 4,526,939
[45] Date of Patent: Jul. 2, 1985

[54] THERMOSETTING COATING COMPOSITIONS FOR THE SEALING OF FIBER REINFORCED PLASTICS

[75] Inventors: Ronald J. Lewarchik, Arlington Heights; Kevin P. Murray, Homewood; Marcella G. Donovan, Ingleside; Arthur T. Jones, Chicago, all of Ill.

[73] Assignee: DeSoto, Inc., Des Plaines, Ill.

[21] Appl. No.: 515,029

[22] Filed: Jul. 18, 1983

[51] Int. Cl.$^3$ .............................................. C08L 67/02
[52] U.S. Cl. .................................... 525/438; 428/413; 428/417; 428/480; 525/454; 525/481; 525/488; 525/510; 525/514; 525/533; 525/922
[58] Field of Search ............... 525/438, 533, 514, 922, 525/454, 481, 488, 510

[56] References Cited

U.S. PATENT DOCUMENTS 3,291,858 12/1966 Oosterhof ........................... 525/514
4,316,940 2/1982 Thornley ............................ 525/438
4,362,847 12/1982 Kooijmans et al. ................. 525/438

Primary Examiner—Theodore E. Pertilla
Attorney, Agent, or Firm—Dressler, Goldsmith, Shore, Sutker & Milnamow

[57] ABSTRACT

High solids thermosetting organic solvent solution coating compositions are disclosed which are particularly useful for sealing the pores in fiber reinforced plastics. These compositions contain a mixture of resins comprising (1) from 30% to 70% of one or more hydroxy functional resins having a number average molecular weight of at least about 700, a Gardner bubble viscosity less than about $Z_4$ measured in methyl ethyl ketone at 90% solids at 25° C., and at least 5% of the hydroxy groups thereof being primary hydroxy groups, (2) from 10% to 70% of low molecular weight epoxy ester made by esterifying one or more resinous polyepoxides having a 1,2-epoxy equivalency of at least 1.2 with an approximately stoichiometric proportion of monocarboxylic fatty acid to provide an essentially epoxy-free ester having a Gardner bubble viscosity less than $Z_4$ at 75% solids in xylol at 25° C., and (3) the balance of the mixture, but not less than 15% thereof, being a curing agent having a plurality of groups reactive with the hydroxy groups in the hydroxy resin and in the epoxy ester.

17 Claims, No Drawings

THERMOSETTING COATING COMPOSITIONS FOR THE SEALING OF FIBER REINFORCED PLASTICS

DESCRIPTION

Technical Field

This invention relates to the coating of plastic surfaces, and especially to the sealing of fiber reinforced plastics, primarily glass fiber reinforced polyester resins, and more particularly to coating compositions for this and related purposes.

Background Art

Fiber reinforced plastic panels and moldings are well known and have diverse utility, as, for example, in automobile body parts, such as fenders, doors, and the like. In order to provide an attractive finish for the panel or molding, the exposed surface of the panel is coated with several coatings and these coatings are cured, as by baking. The term moldings as used herein includes reinforced reaction injection molded compounds, which are usually polyurethanes, polyureas or polyepoxybased materials, as well as in compression molded products. In the language of the art, SMC, BMC and RRIM products are all contemplated. The SMC and BMC products are glass fiber reinforced unsaturated polyester molding compounds used in sheet or bulk form, and RRIM products are the reinforced reaction injection molded compositions.

The exposed surface of the fiber reinforced plastic product commonly contains pores of various size and at times the coating does not adequately penetrate and fill these pores. The result is that when coatings are cured at elevated temperature, gases are released from the pores, producing blisters in the finished coatings. This problem is known as "porosity popping".

A prime objective herein is to fill the pores in the plastic panels before subsequent coatings are applied to provide a more chip-resistant and water-resistant coated product having a more uniform appearance as a result of avoiding or minimizing the porosity popping problem. Also, plastics, such as nylon and polycarbonates and blends containing the same, exhibit poor exterior durability and/or poor resistance to moisture, disadvantages minimized by this invention.

The coatings herein are generally beneficial when applied to plastics which have a heat distortion temperature greater than 235° F., because this is the approximate minimum temperature needed to cure the coatings of this invention.

Disclosure of Invention

In accordance with this invention, thermosetting coating compositions have been found for sealing the pores in porous fiber reinforced plastics and for other related purposes. The compositions of this invention are high solids content solutions comprising one or more hydroxy functional resins, low molecular weight epoxy ester, and a curing agent having a plurality of groups reactive with the hydroxy groups in the polyester and in the epoxy ester.

More particularly, the thermosetting coating compositions of this invention are solvent solution coatings containing at least 35% solids content and comprising (1) hydroxy functional resin in an amount of from 30% to 70% of the mixture of resins, (2) from 10% to 70% of epoxy ester, and (3) the balance of the mixture of resins, but not less than about 15% of the mixture, of curing agents described hereinafter.

Throughout this application and in the claims which follow, all parts and proportions are by weight, unless otherwise stated.

The hydroxy resin in this invention has a number average molecular weight of at least about 700 (measured by gel permeation chromatography), a viscosity less than about $Z_4$ Gardner bubble viscosity measured in methyl ethyl ketone at 90% solids at 25° C., and at least 5% of the hydroxy groups must be of primary character, preferably at least 50%.

The epoxy ester is made by esterifying one or more resinous polyepoxides having a 1,2-epoxy equivalency of at least 1.2 with an approximately stoichiometric proportion of monocarboxylic fatty acid (based on epoxy and carboxyl functionalities). This essentially epoxy-free ester must have a viscosity less than $Z_4$ at 75% solids content in xylol using the Gardner bubble test at 25° C.

It is preferred that from 50% to 75% of the hydroxy functionality be present in the hydroxy resin, with the balance of the hydroxy functionality being supplied by the epoxy ester. The preferred epoxy resins used to constitute the major proportion of the epoxy component of the epoxy ester have a molecular weight below about 1000, more preferably below 500, and most preferably have a 1,2-epoxy equivalency of from 1.7–2.0. A minor proportion of the epoxy component desirably has a 1,2-epoxy equivalency in excess of 2.0, as in epoxy novalac compositions.

The monocarboxylic acids used for esterification desirably have from 6–22 carbon atoms, more preferably from 16–22 carbon atoms, and are most preferably unsaturated. When fatty acids including drying unsaturation are used, a drier salt may also be included.

It is also preferred to employ coatings having a total solids content of from 50% up to about 90%.

The curing agent which is selected is broadly constituted by any known curing agent for hydroxy-functional resins, but it is preferred to employ aminoplast resins, phenoplast resins, or blocked polyisocyanates.

The hydroxy-functional resins used herein are subject to wide variation and may be polyethers, polyesters, polyurethanes or hydroxy-functional copolymers, all of which are well known. The preferred hydroxy-functional resins are polyesters which are the polyesterification reaction products of polyesterifiable components consisting essentially of aliphatic dihydric alcohols and aliphatic dicarboxylic acids, hydroxy functionality being in excess to provide a polyester of moderate molecular weight having an acid value of less than 20, preferably less than 6, and an hydroxyl value in the range of 150–450, preferably 200–350. As will be evident, this describes an essentially linear polyester in which the ratio of hydroxy to carboxy functionality has determined the final hydroxy value and also the final molecular weight. The polyethers, polyurethanes and copolymers useful herein will generally have the same hydroxy and acid values noted for the polyesters.

The preferred dihydric alcohol for use in the polyesters is 1,1,3-trimethyl, 1,3-propane diol, but 1,4-butane diol and 1,6-hexane diol are also useful and illustrative of the class of $C_4$–$C_8$ aliphatic dihydric alcohols which are useful herein. Aliphatic dicarboxylic acids which may be used are $C_4$–$C_{10}$ dicarboxylic acids, such as sebasic acid, adipic acid and azelaic acid. These two components should constitute at least about 85% of the polyester.

Small amounts of other components may be present so long as they do not have any large influence on the character of the polyester. Up to about 5% of the polyester may be constituted by an aromatic polycarboxylic acid, preferably orthophthalic anhydride or trimellitic anhydride, and this helps to provide desirable properties. This acid is coupled to the polyester through the anhydride group and it provides additional acid functionality.

Suitable polyethers are illustrated by polyoxypropylene glycol having an average molecular weight of from 1000 to 3000. Suitable polyurethanes can be provided by reacting the organic polyisocyanate Hylene W (also known as Mondur W) with excess 1,4-butane diol to provide the desired hydroxyl value. Suitable copolymers are made by the solution copolymerization of monoethylenic monomers comprising 5% to 20% of 2-hydroxyethyl acrylate, the other monomers being selected to provide a glass transition temperature of 35° C.

The epoxy ester is preferably constituted by any diglycidyl ether of a bisphenol having a molecular weight less than about 500 which is reacted with an approximately stoichiometric proportion, based on 1,2-oxirane, of a fatty monocarboxylic acid, as previously described. The preferred fatty acids are illustrated by linseed fatty acid, soya fatty acid, and the like, but lauric acid, myristic acid, palmitic acid, stearic acid and oleic acid are also useful.

The diglycidyl ethers of a bisphenol are usually ethers of bisphenol A, but this class of commercially available bisphenol derivatives is well known. The commercial product Epon 828 (Shell Chemical Company) will be used as illustrative.

By a stoichiometric amount of a fatty monocarboxylic acid, as aforesaid, we mean enough acid to consume substantially all the oxirane functionality in the epoxy resin, and this embraces a small excess of acid providing an acid value in the ester of up to about 20, preferably less than 10.

The curing agents are themselves conventional in hydroxy-functional thermosetting coatings. Thus, one may use alkylated aminoplast resins, preferably illustrated by hexamethoxymethyl melamine, and blocked organic polyisocyanates, such as 2-ethyl hexanol-blocked isophorone diisocyanate. The selection of the curing agent and its proportion of use are both conventional.

Proportions are important to this invention. The hydroxy-functional polyester should preferably constitute from 30% to 65% of the mixture of three reactive resins, the epoxy ester should preferably constitute from 15% to 30% on the same basis, and the balance of the mixture of resins will consist essentially of curing agent selected from alkylated aminoplast resins and blocked organic polyisocyanates. Based on the selection of an alkylated aminoplast resin, especially hexamethoxymethyl melamine, these are used in an amount of from 15% to 35%, based on the mixture of resins.

The solvents which are used to provide the desired low viscosity are of secondary significance and are subject to considerable variation. The viscosity is preferably selected to enable air spray or electrostatic spray application. Aromatic hydrocarbons, such as toluene, and commercial mixtures of aromatic solvents are useful, alone or in combination with aliphatic solvents. These are illustrated by acetone, methyl ethyl ketone, butanol, 2-ethoxy ethanol, 2-ethoxy ethanol acetate, butyl acetate, and the like. Of course, the aromatic component of the solvent mixture may be omitted. When an isocyanate cure is used, the systems are desirably water-free and the solvents lack reactive hydrogen atoms.

The sealing compositions of this invention are desirably pigmented, typically to a pigment to binder ratio of 0.65:1, though this may vary from 0.3:1 to 0.9:1. It is preferred to use pigments having a low oil absorption capacity to minimize the increase in viscosity.

The coatings are usually applied by spray, as noted previously, in a thickness of from 3 microns to 1/16 inch. These coatings cure on baking, and the typical bake would be for 30 minutes at 280° F. Of course, one may increase the baking temperature by reducing the baking time. Also, when an organic isocyanate cure is used, the minimum practical baking temperature is lowered somewhat. For aminoplast resins, the minimum baking temperature is about 260° F. which may be lowered to about 230° F. in the presence of acid catalysts such as the disulfonic acids used in the examples.

Example 1—Hydroxy-Functional Polyester Resin Production 25.9 parts of neopentyl glycol is reacted in a hot melt with 35.4 parts of phthalic anhydride to consume the anhydride groups. 35.0 parts of 2,2,4-trimethyl 1,3-pentanediol are then added at 150° C. along with 0.5% of dibutyl tin oxide esterification catalyst and 5% of xylol and esterification is carried out at 185° C. for one hour and then at 200° C. while removing water to provide an acid value of less than 6. The temperature is then lowered to 180° C., and 3.7 parts of trimellitic anhydride is reacted in for 1 hour. Xylol is then added to provide a 90% solution.

A corresponding solution in which the xylol is replaced by methyl ethyl ketone at 90% solids has a Gardner bubble viscosity of about $Z_2$ at 25° C.

Example 2—Production of Epoxy Ester 38.1 parts of a diglycidyl ether of bisphenol A having an average molecular weight of about 390 (Epon 828 of Shell Chemical Company may be used) is mixed with 7.2 parts of an epoxy novolac. The epoxy novolac is prepared by reacting a phenolic novolac with epichlorohydrin and then dehydrohalogenating with sodium hydroxide. The epoxy novolac contains about 3.6 phenol glycidyl ether groups per molecule, the phenol groups being connected to one another by a methylene bridge.

The epoxy resins are placed in solution in a 1:2 weight ratio mixture of xylol and methyl ethyl ketone and esterified with 54.7 parts of soya fatty acids to provide an ester product containing 87.5% solids.

A corresponding solution in which only xylol is used as the solvent and the solution has a solids content of 75% has a Gardner bubble viscosity of about $Z_1$ at 25° C.

Example 3—Production of Pigmented Coating Composition

The following are milled together in a sand mill:

| Pounds | Component |
| --- | --- |
| 158 | Polyester of Example 1 |
| 158 | Epoxy ester of Example 2 |

-continued

| Pounds | Component |
|---|---|
| 101 | Calcined clay |
| 101 | Barium sulfate |
| 43 | Titanium dioxide, rutile |
| 137 | Methyl n-amyl ketone |
| 58 | n-butanol |
| 22 | Carbon black (high structure fine particle size) |
| 124 | Hexamethoxymethyl melamine |
| 0.9 | Cobalt drier (12% in mineral spirits) |
| 0.9 | Zirconium drier (12% in mineral spirits) |
| 14.9 | Dinonyl napthalene disulfonic acid (55% solution in isobutanol) |
| 0.8 | Gamma mercaptopropyl trimethoxy silane |
| 93 | Aromatic solvents (SC 150) |

The acid catalyst used in the above example desirably functions to lower the cure temperature.

Example 4—Application

The solution of Example 3 was air sprayed onto a glass fiber reinforced polyester molding having a porous surface which normally causes porosity popping when topcoated and baked. The coating was then baked for 30 minutes at 280° F. Subsequent topcoating in the same manner as previously caused porosity popping did not result in this problem. Also, the finished product showed better water resistance and adhesion of the topcoat was improved.

What is claimed is:

1. A thermosetting organic solvent solution coating composition containing a mixture of resins comprising (1) from 30% to 70% of one or more hydroxy functional resins having a number average molecular weight of at least about 700, a Gardner bubble viscosity less than about $Z_4$ measured in methyl ethyl ketone at 90% solids at 25° C., and at least 5% of the hydroxy groups thereof being primary hydroxy groups, (2) from 10% to 70% of low molecular weight epoxy ester made by esterifying one or more resinous polyepoxides having a 1,2-epoxy equivalency of at least 1.2 with an approximately stoichiometric proportion of monocarboxylic fatty acid to provide an essentially epoxy-free ester having a Gardner bubble viscosity less than $Z_4$ at 75% solids in xylol at 25° C., and (3) the balance of the mixture, but not less than 15% thereof, being a curing agent having a plurality of groups reactive with the hydroxy groups in the hydroxy resin and in the epoxy ester, said composition having a total solids content of at least 35%.

2. A coating composition as recited in claim 1 in which the composition has a total solids content of from 50% up to about 90%.

3. A coating composition as recited in claim 1 in which said curing agent is selected from aminoplast resins, phenoplast resins, and blocked organic polyisocyanates.

4. A coating composition as recited in claim 1 in which from 50% to 75% of the hydroxy functionality is present in said hydroxy functional resins, with the balance of the hydroxy functionality being supplied by said epoxy ester.

5. A coating composition as recited in claim 1 in which the epoxy component of said epoxy ester has a molecular weight below about 1000.

6. A coating composition as recited in claim 5 in which the epoxy component of said epoxy ester is a diglycidyl ether of a bisphenol having a 1,2-epoxy equivalency of from 1.7-2.0 and a molecular weight below about 500.

7. A coating composition as recited in claim 1 in which at least 50% of the hydroxy groups of said hydroxy functional resins are of primary character.

8. A coating composition as recited in claim 1 in which said monocarboxylic acid contains from 16-22 carbon atoms.

9. A coating composition as recited in claim 8 in which said monocarboxylic acid is unsaturated.

10. A coating composition as recited in claim 9 in which a drier salt is included to aid the cure.

11. A coating composition as recited in claim 1 in which pigment is present to provide a pigment to binder ratio of from 0.3:1 to 0.9:1.

12. A coating composition as recited in claim 1 in which the curing agent is hexamethoxymethyl melamine used in an amount of from 15% to 35%, based on the mixture of three named components, and an acid catalyst is present to lower the curing temperature.

13. A coating composition as recited in claim 1 in which said hydroxy functional resin is an hydroxy functional polyester resin.

14. A coating composition as recited in claim 13 in which said hydroxy functional polyester resin is constituted by the polyesterification product of aliphatic dihydric alcohol with aliphatic dicarboxylic acid constituting at least about 85% of the polyester, and up to about 5% of aromatic polycarboxylic acid.

15. A coating composition as recited in claim 1 in which said hydroxy functional polyester resin has an hydroxy value in the range of 150-450 and an acid value of less than 20.

16. A coating composition as recited in claim 15 in which said hydroxy functional polyester resin has an hydroxy value in the range of 200-350 and an acid value of less than 6.

17. A thermosetting organic solvent solution coating composition containing a mixture of resins comprising (1) from 30% to 65% of hydroxy functional polyester resin having a number average molecular weight of at least about 700, a Gardner bubble viscosity less than about $Z_4$ measured in methyl ethyl ketone at 90% solids at 25° C., and at least 50% of the hydroxy groups being primary hydroxy groups, said polyester resin having an hydroxy value in the range of 150-450 and an acid value of less than 20, (2) from 15% to 30% of an epoxy ester made by esterifying one or more resinous polyepoxides having a molecular weight below about 1000 and having a 1,2-epoxy equivalency of 1.7-2.0 with an approximately stoichiometric proportion of monocarboxylic fatty acid to provide an essentially epoxy-free ester having a Gardner bubble viscosity less than $Z_4$ at 75% solids in xylol at 25° C., and (3) from 15% to 35% of an alkylated aminoplast resin, said composition having a total solids content of from 50% up to about 90%.

* * * * *